Figure 1:
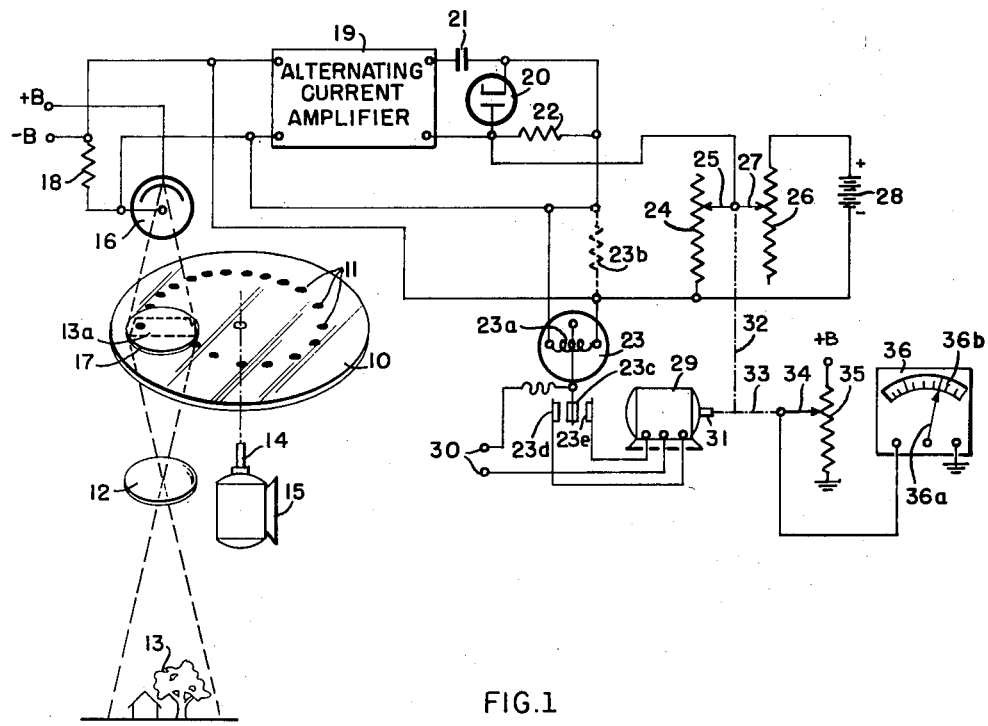

Dec. 4, 1956     W. HOTINE     2,772,598
MINIMUM LUMINANCE RESPONSIVE SYSTEM
Filed Sept. 29, 1954

United States Patent Office 2,772,598
Patented Dec. 4, 1956

2,772,598

MINIMUM LUMINANCE RESPONSIVE SYSTEM

William Hotine, Bayville, N. Y., assignor to Fairchild Camera and Instrument Corporation, a corporation of Delaware Application September 29, 1954, Serial No. 459,140

9 Claims. (Cl. 88—23)

This invention relates to a minimum luminance responsive system and, while it is of general application, it is particularly useful as a sensing device for automatic exposure control apparatus for aerial cameras.

In aerial photography, particularly military photography where the camera is usually positioned in a portion of the plane inaccessible to the photographer, it is desirable to provide a system for automatically controlling the exposure of the camera in accordance with the brightness of the scene being photographed in order to obtain optimum exposure for all scenes and maximum detail in the developed films. One such automatic exposure control apparatus is described and claimed in the copending application of Doyle and Eliot, Serial No. 373,272, filed August 10, 1953, and assigned to the same assignee as the present application.

Authorities have shown that the measurement of minimum luminance is the best criterion for determining the optimum camera exposure. The system of aforesaid Doyle and Eliot application involves the determination of the luminance of the darkest elemental area of the scene or the luminance of the brightest elemental area, or both, and the control of the camera exposure so that the darkest portion of the scene exposes the film only slightly above the density of the fog level while the brightest part of the scene exposes the film near but somewhat below the point of complete reduction of the photosensitive medium of the film. In that application the luminance responsive system includes a conventional Nipkow disc and the signal developed is directly responsive to the maximum and minimum elemental luminance of the scene, the signal representative of the minimum luminance being derived therefrom. The present invention represents a simplification and improvement upon that of the aforesaid copending application for deriving directly an electrical signal representative of the luminance of the elemental area of minimum brightness of the scene.

It is an object of the present invention, therefore, to provide a new and improved minimum luminance responsive system in which there is developed directly an electrical signal representaitve of the minimum luminance of the scene.

It is another object of the invention to provide a new and improved minimum luminance responsive system of maximum simplicity and minimum weight, suitable for application to aerial cameras.

In accordance with the invention, there is provided a system responsive to the minimum luminance of a scene comprising a scanning device for sequentially blocking out elemental areas of the scene, means for developing an electrical signal varying with the total luminance of the unblocked area of the scene under examination by the scanning device, and an electrical detector responsive to the developed signal for detecting the peak value thereof over a scanning period, such peak value of the developed signal being representative of the minimum scene luminance.

For a better understanding of the present invention, together with other and further objects thereof, reference is had to the following description taken in connection with the accompanying drawing, while its scope will be pointed out in the appended claims.

Figure 2:
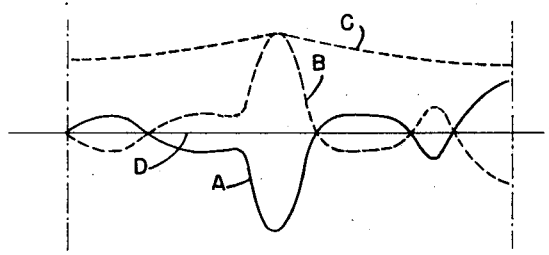

Referring now to the drawing:

Fig. 1 is a schematic representation of a complete minimum luminance responsive system embodying the invention; while Fig. 2 is a graph of certain operating characteristics of the system of Fig. 1 to aid in the explanation of its operation.

Referring now to Fig. 1 of the drawing, there is represented a system responsive to the minimum luminance of a scene comprising a scanning device for sequentially blocking out elemental areas of the scene. Specifically, this scanning device is in the form of a rotatable inverse Nipkow disc 10 which is of transparent material and has a spiral array of opaque elemental areas 11 disposed so that the areas 11 scan successive lines of the image of a scene. The scanning device also includes an optical system, such as an object lens 12, for imaging a scene represented schematically at 13 on the face of the rotatable disc 10 as an image 13a. The disc 10 is mounted on a shaft 14 driven by any suitable device, such as an electric motor 15.

The luminance responsive system of the invention also includes means for developing an electrical signal varying with the total luminance of the unblocked area of the scene under examination by the scanning device described. This means may be in the form of a photoelectric pick-up device or photo-tube 16 and a converging lens 17 for focusing the image 13a on the scanning disc 10 upon the cathode of the photo-tube. The electrodes of the photo-tube 16 are connected in a conventional manner in series with a source +B, —B in series with a load resistor 18.

The luminance responsive system also includes a circuit for amplifying the fluctuating component of the signal developed across the load resistor 18, this means being in the form of an alternating-current amplifier 19 having input terminals connected across the resistor 18 and designed and proportioned to pass and amplify only the fluctuating or alternating component of the signal. The system also includes an electrical detector responsive to the amplified signal for detecting the peak value thereof over a scanning period, such peak value of the rectified signal being representative of the minimum scene luminance. This peak detector comprises a diode rectifier tube 20 connected to the output terminals of amplifier 19 through a coupling condenser 21 and provided with a load resistor 22 connected in parallel with the tube 20. This is a conventional peak rectifier circuit which is effective to develop across the load resistor 22 a unidirectional potential representative of the peak value of the signal at the output terminals of amplifier 19.

The luminance responsive system also includes a circuit for algebraically combining the signal developed by the circuit of the photo-tube 16 and the detected signal, the algebraic sum of such two signals also being representative of the minimum scene luminance. This combining circuit includes the resistor 22 connected in series with the winding 23a of a polarized contact-making galvanometer 23. The winding 23a has an effective resistance represented by the dotted-line resistor 23b. The system also includes a balancing network responsive to the algebraic sum of the signals developed across the resistors 22 and 23b and including an adjustable resistor 24 having a logarithmic resistance-displacement characteristic and having an adjustable contact 25 and an adjustable resistor 26 having a linear resistance-displacement characteristic and having an adjustable contact 27 electrically connected to the adjustable contact 25. The two resistors 24 and 26 are connected in series across a suitable undirectional source, such as a battery 28, so that they effectively comprise a voltage divider with an adjustable contact 25, 27 which is effective to adjust the resistors 24 and 26 in unison in opposite senses.

The luminance responsive system of the invention also includes a servomechanism responsive to the unbalance of the network for rebalancing the same. This servomechanism includes a reversible servomotor 29 connected to be energized from suitable supply terminals 30 and having its direction of rotation controlled by the polarized galvanometer 23. Specifically, the galvanometer is provided with a movable contact 23c co-operating with stationary contacts 23d and 23e effective to energize the motor 29 for rotation in one direction or the other. The motor 29 is provided with an output shaft 31 which is connected to the adjustable contact 25, 27 through the mechanism indicated schematically at 32. The displacement of the servomotor shaft 31 is also representative of the minimum scene luminance and it may be connected to operate a mechanical indicator directly or, as shown, it may be connected by way of a mechanism 33 to an adjustable contact 34 of a voltage-divider resistor 35 connected to a suitable source of potential +B. The potential at contact 34 is connected to a voltmeter 36 having a pointer 36a and an associated scale 36b which may be calibrated directly in terms of luminance.

It is believed that the operation of the minimum luminance responsive system of the invention will be apparent from the foregoing description. In brief, the scene 13 to be photographed is focused to an image 13a on the disc 10 by the lens 12 and, as the disc 10 is rotated by the motor 15, the series of opaque dots 11 scan successive dark lines across the image of the scene in a process which is the inverse of that of the usual Nipkow disc, which scans a series of light lines. At any given instant, the integrated illumination of the scene less that intercepted by the opaque dot then registering with the scene is focused on the photo-tube 16, which develops across its load resistor 18 an electrical signal representative of this integrated luminance. Obviously, when an opaque dot 11 is at a point of maximum luminance, a maximum amount of light is intercepted and the integrated luminance and electrical signal are a minimum. Conversely, when an opaque dot 11 registers with a point of the scene of minimum luminance, the integrated light from the scene and the electrical signal across resistor 18 are a maximum. It is this maximum value of the electrical signal, after amplification by the amplifier 19, which is peak-rectified in the circuit 20, 21, 22 to develop across resistor 22 a unidirectional signal representative of such minimum brightness.

This unidirectional signal is utilized to develop an effect representative of the minimum scene brightness by comparing it with the signal representative of the integrated scene illumination. This latter quantity is represented by the average value of the signal developed across resistor 18, which is impressed directly on the winding 23a of galvanometer 23. The amplitude of the fluctuating component of this signal is so small that it may be neglected. However, the amplification of the unit 19 is preferably of a value equal to the ratio of the total area of the scene to the area of an opaque dot 11 so that, in making the comparisons of the average signal and the peak-rectified value of the fluctuating component, these two signals will be referred to a common base. The connections are such that the unidirectional potential across resistor 22 is connected in circuit with the signal developed across resistor 18 and impressed on galvanometer 23, with opposing polarity. The algebraic sum of these two voltages is then connected to oppose that across the active portion of the voltage-divider resistor 24. If the aglebraic sum of these two voltages is equal and opposite to that of resistor 24, the system is in balance. If, however, the system is unbalanced, a current will flow in the galvanometer winding 23a in such a sense as to cause it to close its contact 23c with the appropriate one of the stationary contacts 23d, 23e to energize the servomotor 29 to run in such a direction as to adjust contact 25 of resistor 24 to rebalance the circuit. The servomotor 29 simultaneously adjusts the contact 34 of voltage-divider resistor 35 so that the signal appearing at the contact 34 and applied to the voltmeter 36 is representative of the value of the minimum scene brightness. The camera operator can then set the camera exposure in accordance with the indication of the meter 36. Alternatively, the potential at the adjustable contact 34 can be utilized directly for camera exposure control, for example, by the use of the system described and claimed in the copending application of Irving W. Doyle, Serial No. 373,258, filed August 10, 1953, and entitled "Automatic Exposure-Control System for Cameras."

The size of the opaque dots 11 relative to the area of the image 13a is not critical, but is a compromise between optical, electrical, and mechanical considerations. For optimum sensitivity, the opaque dots should be as small as consistent with the overall acuity of the sensing system, taking into consideration optical aberration, halation, signal-to-noise ratio, and the gain of the servomechanism. From the mechanical standpoint, the size of the opaque dots 11 should be sufficiently small to permit practical fabrication of a disc 10 of reasonable size.

The use of the combination of resistors 24 and 26 having logarithmic and linear resistance-displacement characteristics, respectively, has an advantage in that the stops on a camera diaphragm vary with the logarithm of the luminance of the scene and a linear adjustment of the camera diaphragm is desirable. This combination also permits the use of a resistor with logarithmic resistance-displacement characteristic of a relatively low range of resistance variation.

In Fig. 2 is represented graphically certain operating characteristics of the system described above. In this figure, curve A represents the variation in luminance of a scene being scanned over a complete scanning cycle, that is, during traverse of the scene by the complete spiral array of opaque dots 11. The electrical signal developed across load resistor 18 of photocell 16 is represented by curve B, the fluctuating component of which, it is seen, is the inverse of that of curve A. In this same figure, curve C represents the peak-rectified signal appearing across resistor 22, while curve D represents the average illumination of the scene and the average electrical signal across resistor 18. Actually curves A, B, and C are idealized and qualitative only for the sake of illustration. In practice, the amplitude of fluctuations of curves A and B will be considerably less than shown and will be amplified by the unit 19 to permit the development of a peak-rectified signal, curve C, of a value of the same order of magnitude as that of curve D, the signal of curve C being connected in series with, and in opposition to, the signal of curve D so that the arithmetical difference is balanced by the signal across resistor 24.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system responsive to the minimum luminance of a scene comprising: a scanning device for sequentially blocking out elemental areas of the scene; means for developing an electrical signal varying with the total luminance of the unblocked area of the scene under examination by said scanning device; and an electrical detector responsive to said signal for detecting the peak value thereof over a scanning period, said peak value of said signal being representative of the minimum scene luminance.

2. A system responsive to the minimum luminance of a scene comprising: a scanning device for sequentially blocking out elemental areas of the scene including a rotatable transparent disc having a spiral array of opaque elemental areas; means for developing an electrical signal varying with the total luminance of the unblocked area of the scene under examination by said scanning device and an electrical detector responsive to said signal for detecting the peak value thereof over a scanning period, said peak value of said signal being representative of the minimum scene luminance.

3. A system responsive to the minimum luminance of a scene comprising: a scanning device for sequentially blocking out elemental areas of the scene including a rotatable transparent disc having a spiral array of opaque elemental areas and an optical system for imaging a scene on said disc; means for developing an electrical signal varying with the total luminance of the unblocked area of the scene under examination by said scanning device; and an electrical detector responsive to said signal for detecting the peak value thereof over a scanning period, said peak value of said signal being representative of the minimum scene luminance.

4. A system responsive to the minimum luminance of a scene comprising: a scanning device for sequentially blocking out elemental areas of the scene; a photoelectric pick-up device responsive to the image scanned by said device for developing an electrical signal varying with the total luminance of the unblocked area of the scene; and an electrical detector responsive to said signal for detecting the peak value thereof over a scanning period, said peak value of said signal being representative of the minimum scene luminance.

5. A system responsive to the minimum luminance of a scene comprising: a scanning device for sequentially blocking out elemental areas of the scene; means for developing an electrical signal varying with the total luminance of the unblocked area of the scene under examination by said scanning device; a circuit for amplifying the fluctuating component of said signal; and an electrical detector responsive to said amplified signal for detecting the peak value thereof over a scanning period, said peak value of said amplified signal being representative of the minimum scene luminance.

6. A system responsive to the minimum luminance of a scene comprising: a scanning device for sequentially blocking out elemental areas of the scene; means for developing an electrical signal varying with the total luminance of the unblocked area of the scene under examination by said scanning device; a circuit for amplifying the fluctuating component of said signal; an electrical detector responsive to said amplified signal for detecting the peak value thereof over a scanning period; and a circuit for algebraically combining said developed signal and said detected signal, such algebraic sum of said signals being representative of the minimum scene luminance.

7. A system responsive to the minimum luminance of a scene comprising: a scanning device for sequentially blocking out elemental areas of the scene; means for developing an electrical signal varying with the total luminance of the unblocked area of the scene under examination by said scanning device; a circuit for amplifying the fluctuating component of said signal; an electrical detector responsive to said amplified signal for detecting the peak value thereof over a scanning period; a circuit for algebraically combining said developed signal and said detected signal; a balancing network responsive to said algebraic sum; and a servomechanism responsive to the unbalance of said network for rebalancing the same, the displacement of said servomechanism being representative of the minimum scene luminance.

8. A system responsive to the minimum luminance of a scene comprising: a scanning device for sequentially blocking out elemental areas of the scene; means for developing an electrical signal varying with the total luminance of the unblocked area of the scene under examination by said scanning device; a circuit for amplifying the fluctuating component of said signal; an electrical detector responsive to said amplified signal for detecting the peak value thereof over a scanning period; a circuit for algebraically combining said developed signal and said detected signal, a balancing network responsive to said algebraic sum; a reversing contact-making galvanometer responsive to the unbalance of said network; and a servomotor controlled by said galvanometer for rebalancing said network, the displacement of said servomechanism being representative of the minimum scene luminance.

9. A system responsive to the minimum luminance of a scene comprising: a scanning device for sequentially blocking out elemental areas of the scene; means for developing an electrical signal varying with the total luminance of the unblocked area of the scene under examination by said scanning device; an electrical detector responsive to said amplified signal for detecting the peak value thereof over a scanning period; a circuit for algebraically combining said developed signal and said detected signal; a balancing network responsive to said algebraic sum and including a linearly adjustable resistor in series with a logarithmically adjustable resistor, said resistors being adjustable in unison in opposite senses; and a servomechanism responsive to the unbalance of said network for rebalancing the same, the displacement of said servomechanism being representative of the minimum scene luminance.

References Cited in the file of this patent
UNITED STATES PATENTS

| | | |
|---|---|---|
| 2,422,766 | Alexander | June 24, 1947 |
| 2,467,057 | Simmon | Apr. 12, 1949 |
| 2,608,128 | Kelsey | Aug. 26, 1952 |